E. E. BIRCH.
TRUCK FOR REPLACING DERAILED STREET CARS.
APPLICATION FILED FEB. 11, 1908.
No. 905,050. Patented Nov. 24, 1908.
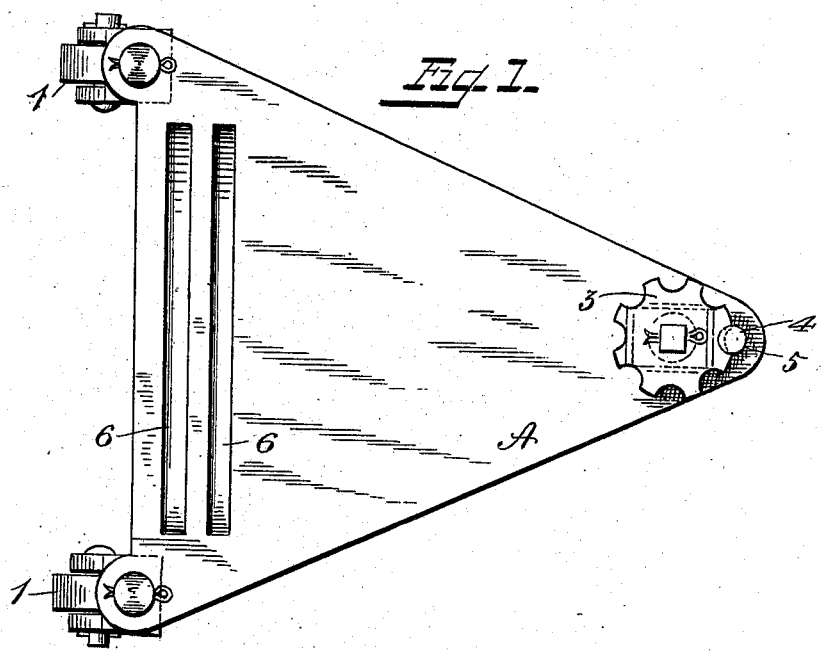
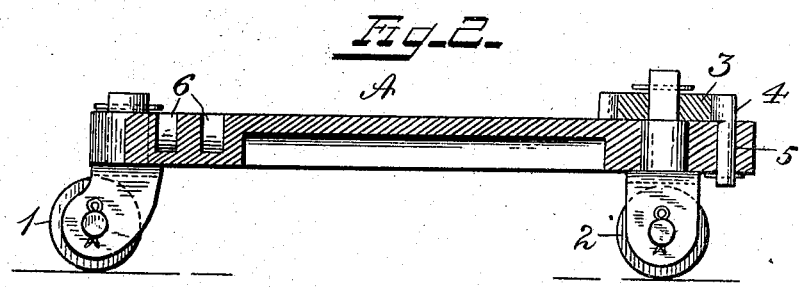
Witnesses
F. L. Ourand
M. K. Freeman
Inventor
Elmer E. Birch
By Louis Bagger
his Attorneys

UNITED STATES PATENT OFFICE.

ELMER E. BIRCH, OF EAST LIVERPOOL, OHIO.

TRUCK FOR REPLACING DERAILED STREET-CARS.

No. 905,050.  Specification of Letters Patent.  Patented Nov. 24, 1908.

Application filed February 11, 1908. Serial No. 415,421.

*To all whom it may concern:*

Be it known that I, ELMER E. BIRCH, a citizen of the United States, residing at East Liverpool, in the county of Columbiana and State of Ohio, have invented certain new and useful Improvements in Trucks for Replacing Derailed Street-Cars, of which the following is a specification.

My invention relates to an improvement in trucks for replacing derailed street cars, and the object is to provide a truck whereby the flanges of the wheels can be placed in slots or grooves in the truck and the truck moved to the desired position, whereby the wheels can be placed on the track without losing a great deal of time.

The invention relates to certain other novel features of construction and combinations of parts which will be hereinafter described and pointed out in the claims.

In the accompanying drawings Figure 1 is a top plan view; Fig. 2 is a sectional view, and Fig. 3 is a detail.

A, represents the body of the truck, which is preferably made in the form of a triangle having wheels or casters 1, 1 at two corners. At the third corner a guide wheel or caster 2 is connected to the body of the truck having its shank extending therethrough, and mounted on the shank is a notched heel 3, which is held from movement by a pin 4 passing through an opening 5 in the truck, the head of the pin being in the form of a cam and adapted to enter the notches in the wheel. After the wheel 3 has been locked in position by the pin 4 it prevents the wheel 2 from moving, whereby the wheel 2 acts as a guide wheel for the truck.

The body of the truck is provided with slots or grooves 6, 6, which are preferably arc-shaped, so that they will conform to the shape of the wheel flange of the car.

When it is desired to replace a derailed car on the track two trucks are placed under the two wheels of the truck of the derailed car having the flanges of the wheels fitting in the grooves 6 of the truck, when the car is pushed around until the derailed truck is in position so that the wheels thereof can be placed upon the track.

It is evident that slight changes might be resorted to in the form and arrangement of the several parts described without departing from the spirit and scope of my invention, and hence I do not wish to limit myself to the exact construction herein set forth; but:—

Having fully described my invention, what I claim as new and desire to secure by Letters Patent is:—

1. A truck for replacing derailed street cars comprising a body portion having grooves received therein to receive the flange of the wheel to be replaced, wheels connected to the body portion, a guide wheel connected thereto, a wheel connected to the guide wheel, and means engaging the wheel for regulating the direction of movement of the guide wheel.

2. A truck comprising a triangular body portion, wheels connected thereto, a guide wheel, a notched wheel connected to the guide wheel, and means engaging the notched wheel whereby the direction of movement of the guide wheel is regulated.

3. A truck comprising a body portion having grooves formed therein, wheels connected to the truck, a guide wheel connected thereto, a notched wheel connected to the guide wheel, and means engaging the notched wheel for regulating the direction of movement of the guide wheel.

In testimony whereof I affix my signature in presence of two witnesses.

ELMER E. BIRCH.

Witnesses:
WALTER B. HILL,
ROLAND E. HILL.